March 1, 1932.  A. C. FAWCETT  1,847,869
SPRAYING DEVICE
Filed Sept. 8, 1928
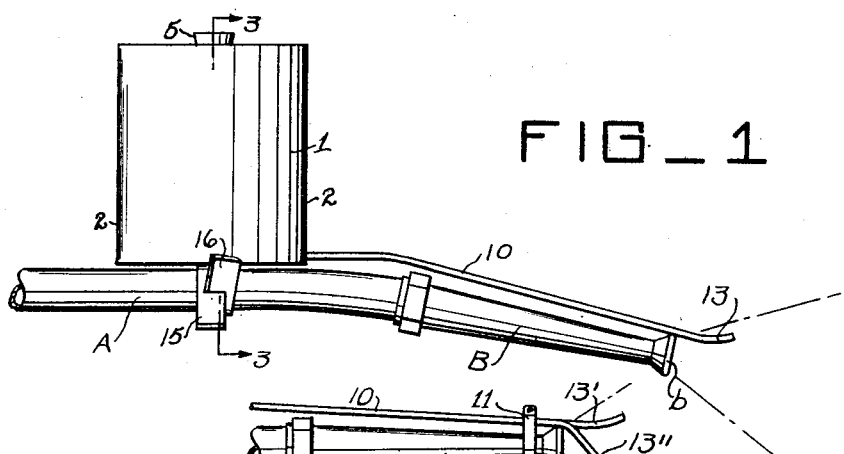
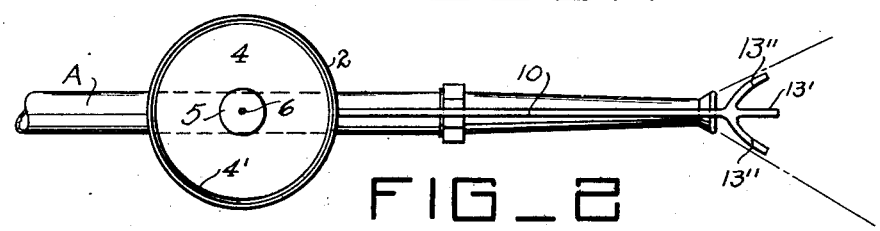
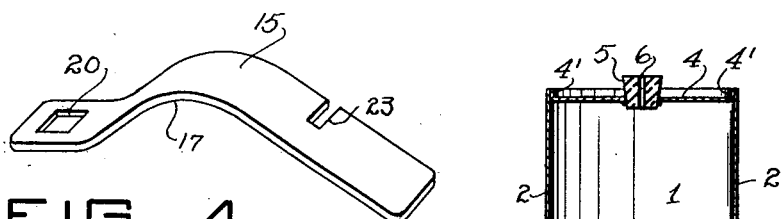
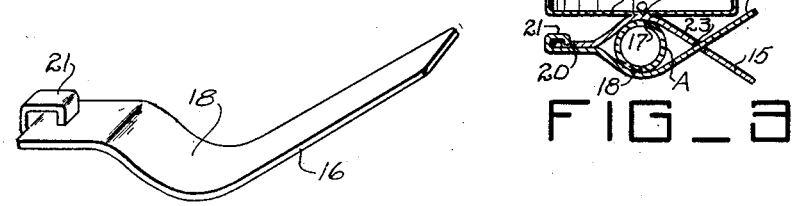
Inventor
Arthur C. Fawcett
By Bates, Macklin, Golrick & Teare
Attorneys Patented Mar. 1, 1932

1,847,869

UNITED STATES PATENT OFFICE

ARTHUR C. FAWCETT, OF BEREA, OHIO

SPRAYING DEVICE

Application filed September 8, 1928. Serial No. 304,632.

This invention relates to spraying devices and the primary object is to provide a novel apparatus for applying ingredients such as insecticides and fertilizers in solution to plants.

A further object is to provide a spraying apparatus for use in connection with a common garden hose, which apparatus may be quickly attached to and detached from hose devices of various types and sizes without disturbing any of the parts of the hose assembly, or interfering with the usual nozzle adjustment and manipulation of the nozzle to direct the spray.
Further objects include the provision of an apparatus of the character above outlined, which may be very economically manufactured and sold at a small cost.

Other objects and features of the invention will become apparent from the following description relating to the accompanying drawings, showing the preferred form of my invention. The essential novel characteristics are summarized in the claims.
In the drawings, Fig. 1 is a side elevation of the end of a garden hose with my spraying apparatus associated therewith; Fig. 2 is a plan view of the apparatus shown in Fig. 1; Fig. 2A is a fragmentary side elevation of a modified form of the apparatus; Fig. 3 is a vertical cross-sectional view taken substantially along the line 3—3 of Fig. 1, and Figs. 4 and 5 are detailed perspective views leading alongside the nozzle and directly into the stream of water as this is projected from the nozzle.

In the modification shown in Fig. 1, A indicates the flexible or rubber portion of a garden hose and B the turnably adjustable handle portion of an ordinary nozzle assembly including the usual nozzle tip $b$. A suitable tank for containing the solution to be sprayed is indicated at 1. This has side wall portions 2, a bottom wall 3 and a cover member 4 flanged at its edges as at 4' to form a closure for the top of the tank, as shown in Fig. 3. For charging the tank I may employ a stopper such as 5, this being vented as at 6 to allow the maintenance of atmospheric pressure within the tank on the body of solution therein. The vent hole in the stopper may, if desired, be suitably regulated, in any known manner, so as to prevent more than the required amount of solution from being drawn into the spray.

Attached to the tank near the bottom thereof and extending alongside the nozzle I show a tube 10, preferably metal. This may, if desired, be guided and held in proper relation to the end of the nozzle as by a clip 11 shown in Fig. 2A. This may loosely fit the nozzle to permit the latter to turn freely for adjustment. The discharge end 13 of the tube is preferably curved as shown in order that its tip may be substantially parallel to the flow of water from the nozzle, as normally adjusted for spraying plants.

strips shown at 15 and 16, preferably sheet metal. Each of these strips has a depressed portion, these portions being oppositely disposed for engaging opposite sides of the hose. The depressions are indicated at 17 and 18. The flexible member 15 may be suitably secured as by spot welding to the bottom of the container, as shown in Fig. 3 at 19. The two strips 15 and 16 may be permanently joined as by a hinge construction, see Figs. 3, 4 and 5, wherein the strip 15 is shown as having an opening 20 through which extends a looped projection 21 of the member 16. In fastening the assembly to the hose, the strip 16 may be sidewardly flexed to allow it to be seated in a lateral groove 23 in the member 15. When so seated the two parts occupy substantially the position shown in Fig. 1. When the hose becomes somewhat rigid, due to the fact that water is being projected through it under pressure, this arrangement will hold the tank and tube very rigidly to maintain the proper relation of the tube end or ends to the nozzle $b$.

I claim:

1. Apparatus of the kind described comprising a container, adapted to be charged, a device carried on one wall of the container and adapted to embrace a garden hose, said device comprising two flexible members hinged together and arranged to interlock at their free ends, there being conduit means extending from the container alongside such hose and having its end portion positioned in the path of liquid projected from the hose.

2. An apparatus of the kind described, comprising a container, an upwardly bowed flexible member attached to the bottom of the container and a downwardly bowed cooperating flexible member in hinged relation to the first mentioned member and arranged to interlock with such first mentioned member to form an attachment between the container and hose, there being tubular means extending from the container alongside the nozzle of the hose and into the stream of liquid adapted to be projected thereby.

In testimony whereof, I hereunto affix my signature.

ARTHUR C. FAWCETT.